US006982842B2

(12) United States Patent
Jing et al.

(10) Patent No.: US 6,982,842 B2
(45) Date of Patent: Jan. 3, 2006

(54) PREDICTIVE DISC DRIVE FAILURE METHODOLOGY

(75) Inventors: Gary Gang Jing, Shakopee, MN (US); Scott Douglas Ulrich, Apple Valley, MN (US); Timothy Edward Langlais, Minneapolis, MN (US); Yi Q. Lin, Mendota Heights, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 340 days.

(21) Appl. No.: 10/354,768

(22) Filed: Jan. 30, 2003

(65) Prior Publication Data

US 2004/0051988 A1    Mar. 18, 2004

Related U.S. Application Data

(60) Provisional application No. 60/410,983, filed on Sep. 16, 2002, provisional application No. 60/410,991, filed on Sep. 16, 2002.

(51) Int. Cl.
  *G11B 27/36*    (2006.01)
(52) U.S. Cl. .......................... 360/31; 360/53; 324/212
(58) Field of Classification Search ................. 360/31, 360/53, 75, 77.02, 78.04; 324/210, 212, 324/226; 369/53.1; 702/185, 183, 182; 714/57, 37, 40, 46, 47, 48, 54, 718, 704, 714/770
See application file for complete search history.

(56) References Cited

U.S. PATENT DOCUMENTS 5,699,510 A    12/1997    Petersen et al.
5,727,144 A    3/1998    Brady et al.
5,828,583 A    10/1998    Bush et al.
5,832,199 A    11/1998    Apperley et al.
5,841,260 A    11/1998    Imai
5,889,784 A    3/1999    Rogers
5,917,724 A    6/1999    Brousseau et al.
5,991,707 A    11/1999    Searles et al.
6,205,409 B1    3/2001    Zvonar
6,249,887 B1    6/2001    Gray et al.
6,249,890 B1    6/2001    Ukani et al.
6,292,912 B1    9/2001    Cloke et al.
6,295,577 B1    9/2001    Anderson et al.
6,317,850 B1    11/2001    Rothberg
6,359,433 B1    3/2002    Gillis et al.
6,415,189 B1    7/2002    Hajji
6,460,151 B1    10/2002    Warwick et al.
6,600,614 B2 *    7/2003    Lenny et al. .................. 360/31
2003/0112538 A1 *    6/2003    Smith .......................... 360/31

OTHER PUBLICATIONS

Bayesian approaches to failure prediction for disk drives, Department of Computer Science and Engineering, University of CA, Greg Hamerly and Charles Elkan, 8 pages, 1995-2000.
Improved Disk-Drive Failure Warnings, IEEE Transactions on Reliability, vol. 51, No. 3, Sep. 2002.

* cited by examiner

Primary Examiner—Alan T. Faber
(74) Attorney, Agent, or Firm—Westman, Champlin & Kelly

(57) ABSTRACT

A method of performing predictive failure analysis (PFA) for a disc drive includes maintaining at least two primary error counts during operation of the disc drive. The primary error counts each correspond to disc drive errors associated with different attributes of the disc drive and are potentially indicative of disc drive failure. Imminent disc drive failure is predicted based upon a combination of the primary error counts.

29 Claims, 8 Drawing Sheets

PREDICTIVE DISC DRIVE FAILURE METHODOLOGY

CROSS-REFERENCE TO RELATED APPLICATION

This application claims priority from U.S. Provisional Application No. 60/410,983 filed on Sep. 16, 2002 for inventors Gary Gang Jing, Scott Douglas Ulrich, Timothy Edward Langlais and Yi Q. Lin and entitled "MULTI-VARIATE PREDICTIVE FAILURE METHODOLOGY FOR DISC DRIVES", and U.S. Provisional Application No. 60/410,991 filed on Sep. 16, 2002 for inventors Gary Gang Jing, Scott Douglas Ulrich, Timothy Edward Langlais and Yi Q. Lin and entitled "BI-VARIATE PREDICTIVE FAILURE METHODOLOGY FOR DISC DRIVE."

FIELD OF THE INVENTION

The present invention relates generally to disc drive storage systems and more particularly, but not by limitation, to a method of performing predictive failure analysis for a disc drive based upon a combination of two or more disc drive attribute error counts.

BACKGROUND OF THE INVENTION

Disc drives are used as primary data storage devices in modern computer systems and networks. While very reliable, today's disc drives occasionally fail. In addition to causing computer system downtime, such disc drive failures can result in the loss of some or all of the data stored in the disc drive. Accordingly, disc drives commonly perform Predictive Failure Analysis (PFA) using Self-Monitoring, Analysis and Reporting Technology (SMART), to predict disc drive failure caused by the gradual decay of electrical and/or mechanical components of the disc drive. The primary goal of PFA is to predict when disc drive failure is imminent to allow the data stored in the disc drive to be archived.

PFA is generally performed during the operation of the disc drive by monitoring key disc drive attributes that are indicative of the health of the disc drive. Additionally PFA can be implemented by performing periodic self-diagnostic tests on the disc drive. Present methods of performing PFA in disc drives will predict imminent disc drive failure based upon errors associated with a single attribute (e.g., read errors, seek errors, fly-height errors, etc.). In these methods, errors corresponding to the single attribute are monitored and compared to a threshold value. When the errors exceed the threshold, a warning of imminent disc drive failure is provided to the user.

Clearly, it is critical that the PFA method utilized in the disc drive accurately predict imminent disc drive failure. However, it is also important that the method not be overly sensitive to indications of imminent disc drive failure. In other words, while it is important to correctly identify disc drives that are about to fail, it is also equally important to avoid falsely predicting an imminent failure when the disc drive is properly functioning.

SUMMARY OF THE INVENTION

The present invention is directed to a method of performing predictive failure analysis (PFA) for a disc drive that provides accurate predictions of imminent disc drive failure while reducing the likelihood of false disc drive failure predictions. In the method, at least two primary error counts are maintained during operation of the disc drive. The primary error counts each correspond to disc drive errors associated with different attributes of the disc drive. Finally, imminent disc drive failure is predicted based upon a combination of the primary error counts.

Another aspect of the invention provides a correction mechanism that adjusts one or more of the primary error counts to provide compensation for improvements in disc drive performance. This feature reduces the likelihood of falsely predicting an imminent failure when the disc drive is functioning properly.

Other features and benefits that characterize embodiments of the present invention will be apparent upon reading the following detailed description and review of the associated drawings.

DETAILED DESCRIPTION OF ILLUSTRATIVE EMBODIMENTS

Figure 1:
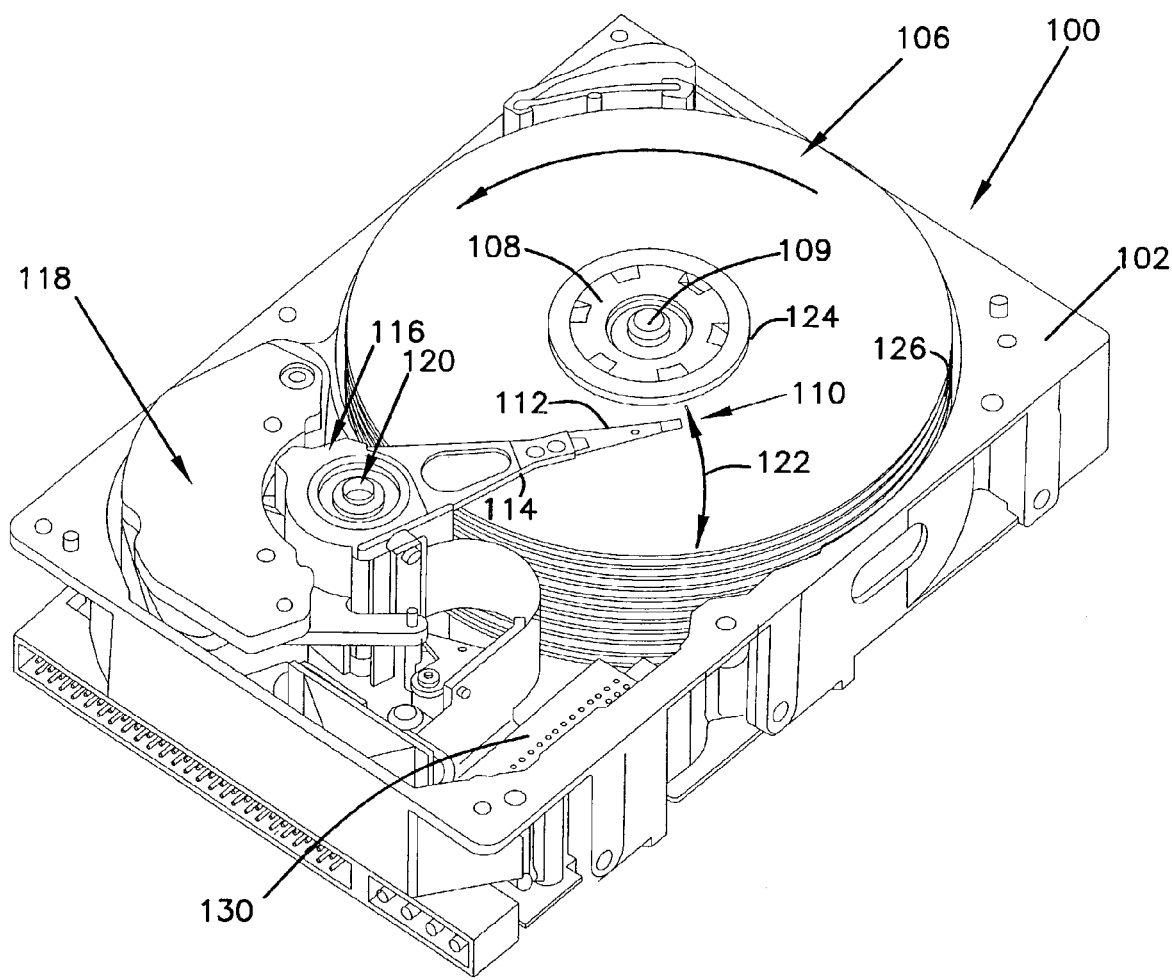
FIG. 1 is an isometric view of a disc drive.

FIG. 1 is an isometric view of an example of a disc drive 100 with which the method of the present invention can be used to provide predictive failure analysis (PFA). Disc drive 100 includes a housing with a base 102 and a top cover (not shown). Disc drive 100 further includes a disc pack 106, which is mounted on a spindle motor (not shown) by a disc clamp 108. Disc pack 106 includes a plurality of individual discs, which are mounted for co-rotation about central axis 109. Each disc surface has an associated disc head slider 110 which is mounted to disc drive 100 for communication with the disc surface. In the example shown in FIG. 1, sliders 110 are supported by suspensions 112 which are in turn attached to track accessing arms 114 of an actuator 116. The actuator shown in FIG. 1 is of the type known as a rotary moving coil actuator and includes a voice coil motor (VCM), shown generally at 118. Voice coil motor 118 rotates actuator 116 with its attached heads 110 about a pivot shaft 120 to position heads 110 over a desired data track along an arcuate path 122 between a disc inner diameter 124 and a disc outer diameter 126. Voice coil motor 118 is driven by servo electronics 130 based on signals generated by heads 110 and a host computer (not shown).

The PFA method of the present invention avoids problems associated with a single attribute triggered disc drive failure prediction solution by using at least two attributes in combination to determine whether disc drive failure is imminent. In accordance with a preferred embodiment of the invention, two attributes are monitored in the method. However, three or more attributes can also be monitored in the method to provide the desired PFA. It has been determined that this use of multiple attributes can lead to more accurate disc drive failure prediction. Additionally, the method of the present invention reduces the likelihood of false failure predictions, where a properly functioning disc drive is prematurely diagnosed as nearing failure.

As understood by those skilled in the art, the PFA method of the present invention can be implemented through micro-code instructions, executed by a controller of the disc drive, that control local disc drive operations. The detection of imminent disc drive failure can cause the micro-code to respond by posting an error signal that can be used to generate a warning. A user of the disc drive, or the system utilizing the disc drive, is thereby given an opportunity to respond by taking the disc drive off-line or by taking other appropriate action to protect the data that might otherwise be lost or compromised by an imminent disc drive failure.

Figure 2:
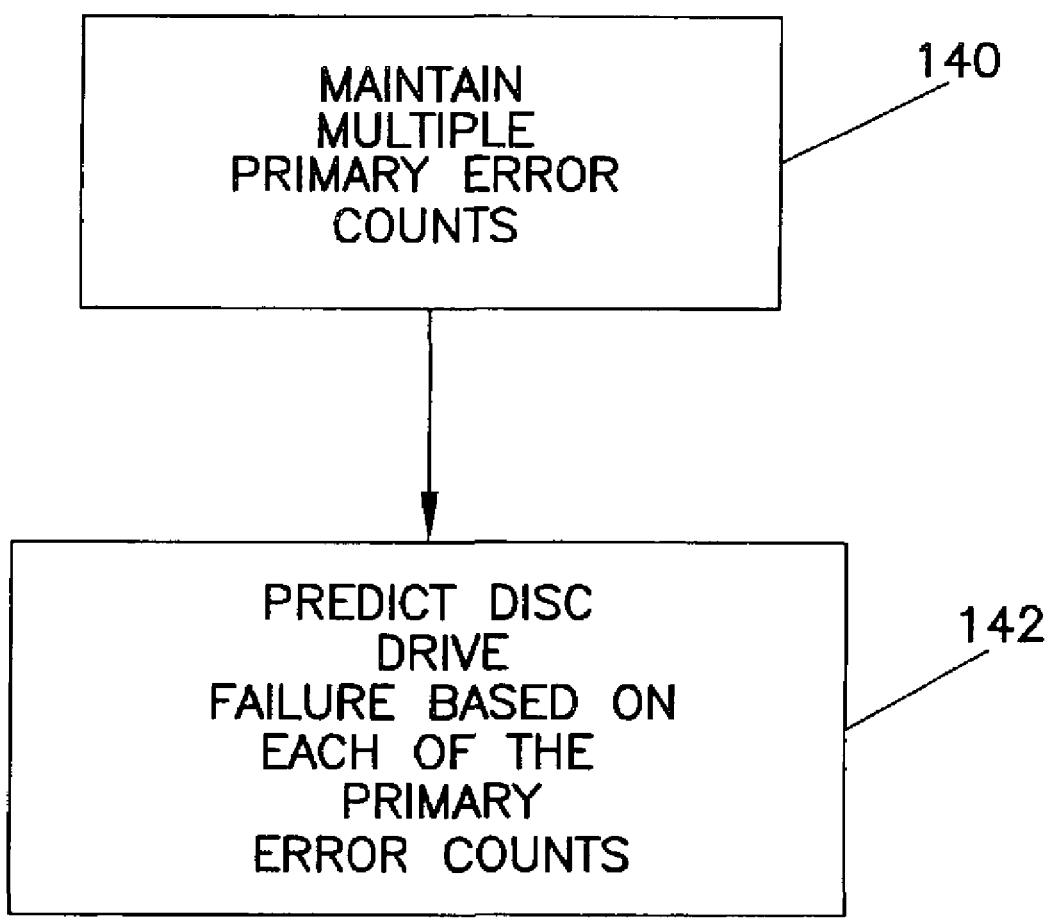
FIG. 2 is a flowchart illustrating a method of performing predictive failure analysis for a disc drive in accordance with an embodiment of the invention.

The method of the present invention is generally illustrated in the flowchart of FIG. 2. Initially, multiple primary error counts are maintained at step 140. Each of the primary error counts corresponds to a unique attribute of the disc drive. The error count can be any measure of errors associated with the corresponding attribute, which results in a measure of the condition of the disc drive. As will be discussed in greater detail below, the primary error counts are preferably error counts of threshold violations of errors associated with the particular attribute. At step 142, a prediction of imminent failure of the disc drive is made based upon a combination of the multiple primary error counts.

There are several disc drive attributes that can be monitored to provide the primary error counts. These include on-line and off-line attributes. The on-line attributes are monitored by the disc drive during normal operation without adversely affecting the performance of the disc drive. These include, for example, logical block address (LBA) reassignment, recoverable read error rates, data errors caused by thermal asperities, recoverable seek error rates, spin-up retry counts, and other attributes. The off-line attributes are generally monitored by conducting a diagnostic test on the disc drive, which can adversely affect the disc drive's performance if done on-line. One example of an off-line attribute is fly height error.

In accordance with one embodiment of the invention, first and second attributes are monitored and corresponding error counts are maintained and combined to provide the desired disc drive failure analysis. Any disc drive attribute, including those described above, that indicate disc drive degradation and potential failure can be used. In accordance with one preferred embodiment of the invention, the attributes chosen for monitoring are the recoverable read error rate and the recoverable seek error rate. These attributes are known as rate-based "soft" errors. The recoverable read error rate corresponds to read errors that are recovered through known correction methods, such as using an error correction code (ECC). The recoverable seek errors correspond to errors that occur during an attempt to move a transducing head to a desired track of a disc, which are corrected using known methods.

Most of the errors associated with the monitored attributes are expected to occur periodically. Prediction of imminent disc drive failure is based, in part, upon the frequency and quantity of detected errors. In accordance with one embodiment, each primary error count is incremented when a secondary error count reaches a predetermined relationship to an empirically set second threshold value within a predetermined interval. The interval can be a period of time, a number of events that are related to the attribute (e.g., 100,000 reads, 100,000 seeks, etc.), or other type of interval. Additionally, the interval can be fixed or variable. It should also be understood that the error counts can be normalized, for example, by the number of reads/seeks that are conducted during the interval for comparison to normalized threshold values.

Figure 3:
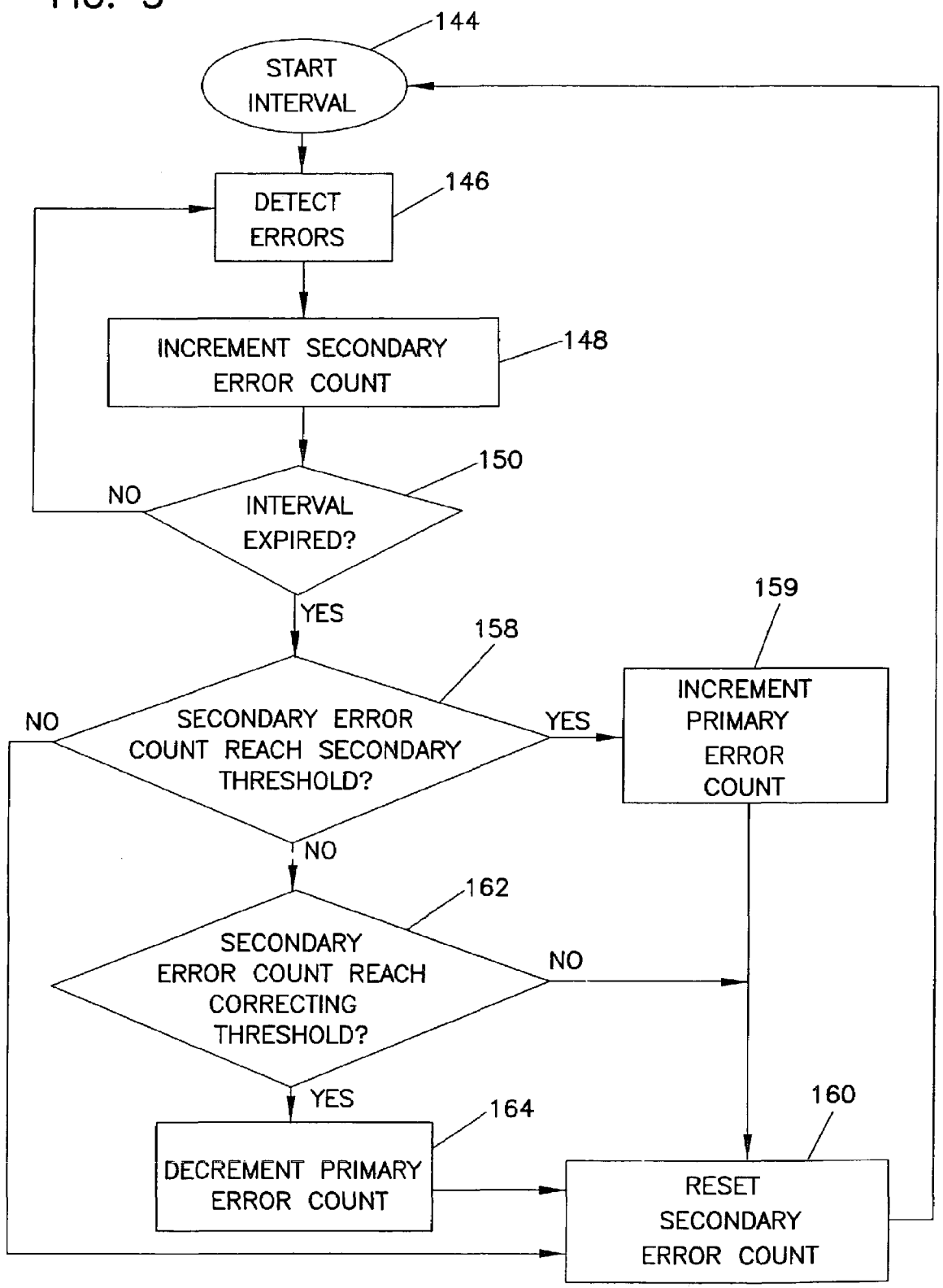
FIG. 3 is a flowchart illustrating a method of maintaining a primary error count in accordance with embodiments of the invention.

In accordance with one embodiment of the invention, the primary error counts are maintained in accordance with the method illustrated in the flowchart of FIG. 3. Initially, at 144, an interval is started. Errors associated with a particular attribute are detected either through on-line monitoring of on-line attributes, or by conducting an appropriate diagnostic test for off-line attributes, at 146. As indicated at 148, a corresponding secondary error count is incremented for each error that is detected during the monitoring of the attribute. If the interval is fixed, the method continues to detect errors and increment the secondary error count until the interval expires, as indicated at decision block 150.

Figure 4:
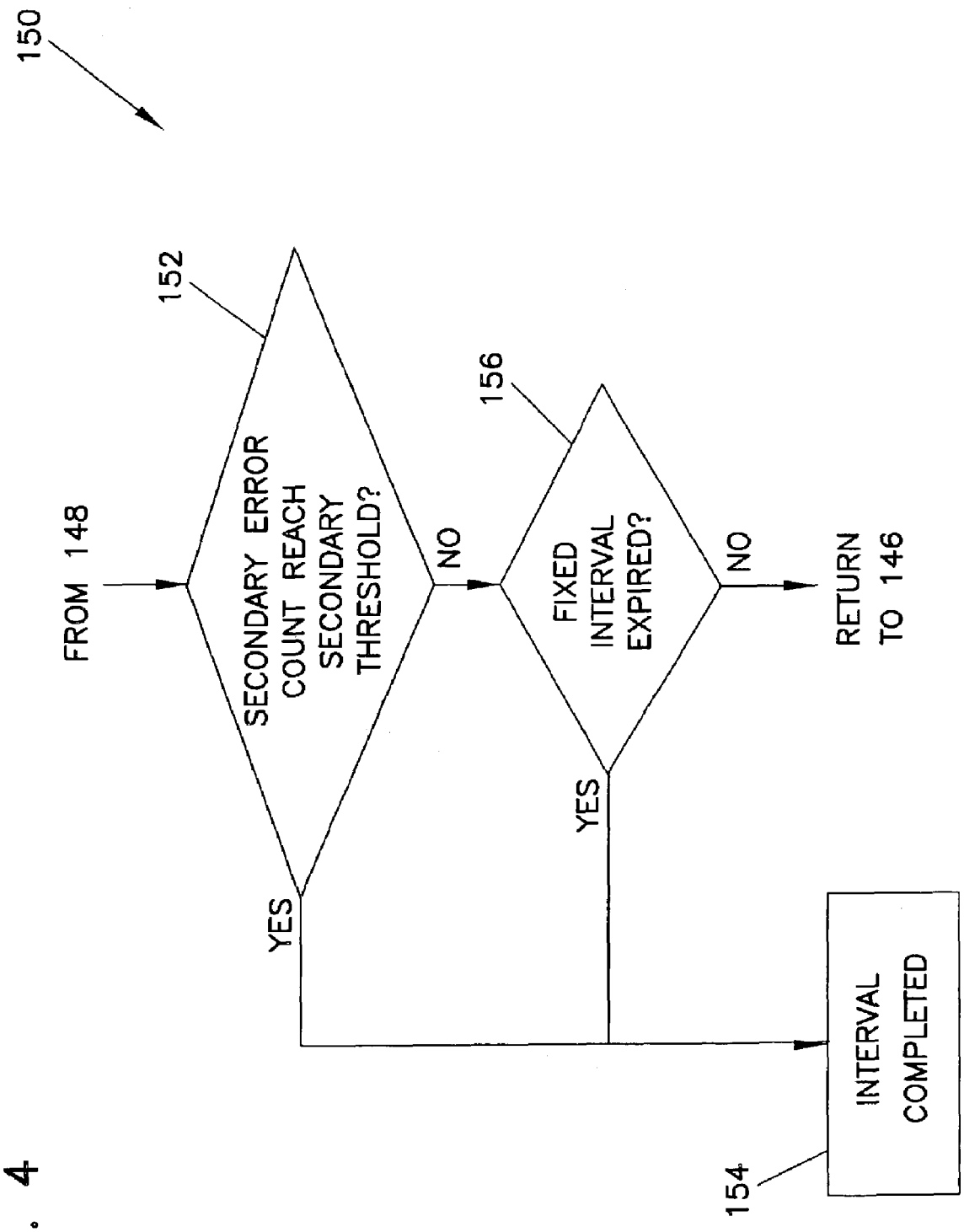
FIG. 4 is a flowchart illustrating the use of a variable interval in accordance with an embodiment of the invention.

Alternatively, a variable interval (decision block 150) can be controlled in accordance with the flowchart of FIG. 4. Here, the secondary error count is compared to a secondary threshold value at 152. The interval expires when the secondary error count reaches a predetermined relationship to the secondary threshold value as indicated at 154. The predetermined relationship can be set as desired, but is preferably reached when the secondary error count equals or exceeds the secondary threshold value. If the predetermined relationship is not reached, the method moves to decision block 156 where a check is made to determine whether the fixed interval length, or maximum allowed interval, has expired. If the interval has expired, the method continues from 150 of the flowchart of FIG. 3 accordingly. On the other hand if, at 156, it is determined that the fixed or maximum interval has yet to expire, the method continues at 146 of the flowchart of FIG. 3.

Referring again to FIG. 3, following the expiration of the fixed or variable interval at block 150, the method continues to 158, where the secondary error count is compared to the secondary threshold value. The corresponding primary error count is incremented at 159 when the secondary error count reaches a predetermined relationship to the secondary threshold value. The predetermined relationship is preferably set such that it is determinative of disc drive attribute degradation. In accordance with one embodiment, the predetermined relationship is reached when the secondary error count equals or exceeds the secondary threshold value. The method then moves to 160 where the secondary error count is reset before returning to 144 where the interval is restarted. When the secondary error count does not reach the predetermined relationship to the secondary threshold value, as determined in decision block 158, the method can continue directly to 160 where the secondary error count is reset, and then to 144 to restart the interval.

In accordance with an alternative embodiment of the invention (indicated by a dashed arrow), the method can continue to decision block 162 where the secondary error count is compared to a correcting threshold value. If it is determined in block 162 that the secondary error count has not reached a predetermined relationship to the correcting threshold value, the method resets the secondary error count at 160 and restarts the interval at 144. When it is determined that the secondary error count reached the predetermined relationship to the correcting threshold value at 162, the method moves to 164 where the primary error count is decremented. This decrementing of the primary error count compensates the primary error count when the monitored attribute of the disc drive no longer indicates that the disc drive is degrading, but is possibly improving. The correcting threshold value and the predetermined relationship are preferably set to ensure that improvement to monitored attribute is occurring. In accordance with one embodiment, the correcting threshold value is set to that of the secondary threshold value, and the predetermined relationship is met when the secondary error count is less than the secondary threshold value. Additionally, the method can be adjusted to require multiple indications of performance improvement over a span of several intervals, rather than the single interval described above, before the primary error count is decremented. Following the adjustment to the primary error count, the method then repeats by resetting the secondary error count at 160, and starting a new interval at 144.

Compensating the primary error count when the monitored attribute indicates a performance improvement is particularly helpful in guarding against false disc drive failure predictions that can occur due to transient environmental conditions that temporarily degrade disc drive performance. For example, accidental impacts to the case containing the disc drive can cause a temporary degradation in disc drive performance as indicated by a monitored attribute. This can result in the secondary error count quickly reaching the predetermined relationship to the secondary threshold value, thereby indicating disc drive attribute degradation. However, once the impacts to the case end, the disc drive could return to the same condition it was in prior to the impacts. As a result, the primary error count associated with an adversely affected attribute following such a transient environmental condition would not be an accurate measure of the condition of the attribute, which could lead to a premature disc drive failure prediction. This problem is resolved by decrementing the primary error count as described above to provide better assurance that a failure prediction will not be prematurely triggered as a result of such transient environmental conditions.

Figure 5:
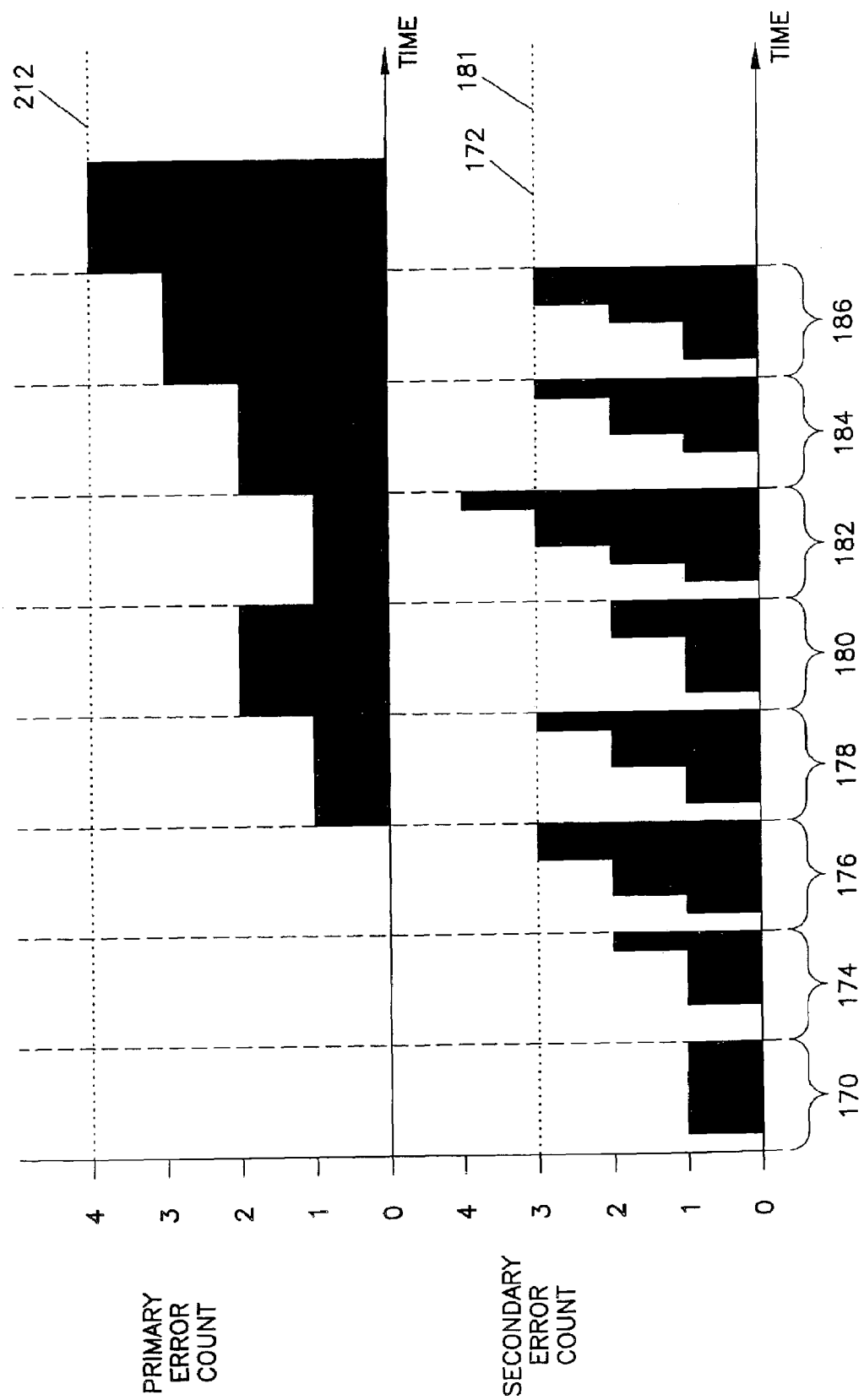
FIGS. 5 and 6 are graphs illustrating the maintaining of primary and secondary error counts respectively using fixed and variable intervals, in accordance with embodiments of the invention.
Figure 6:
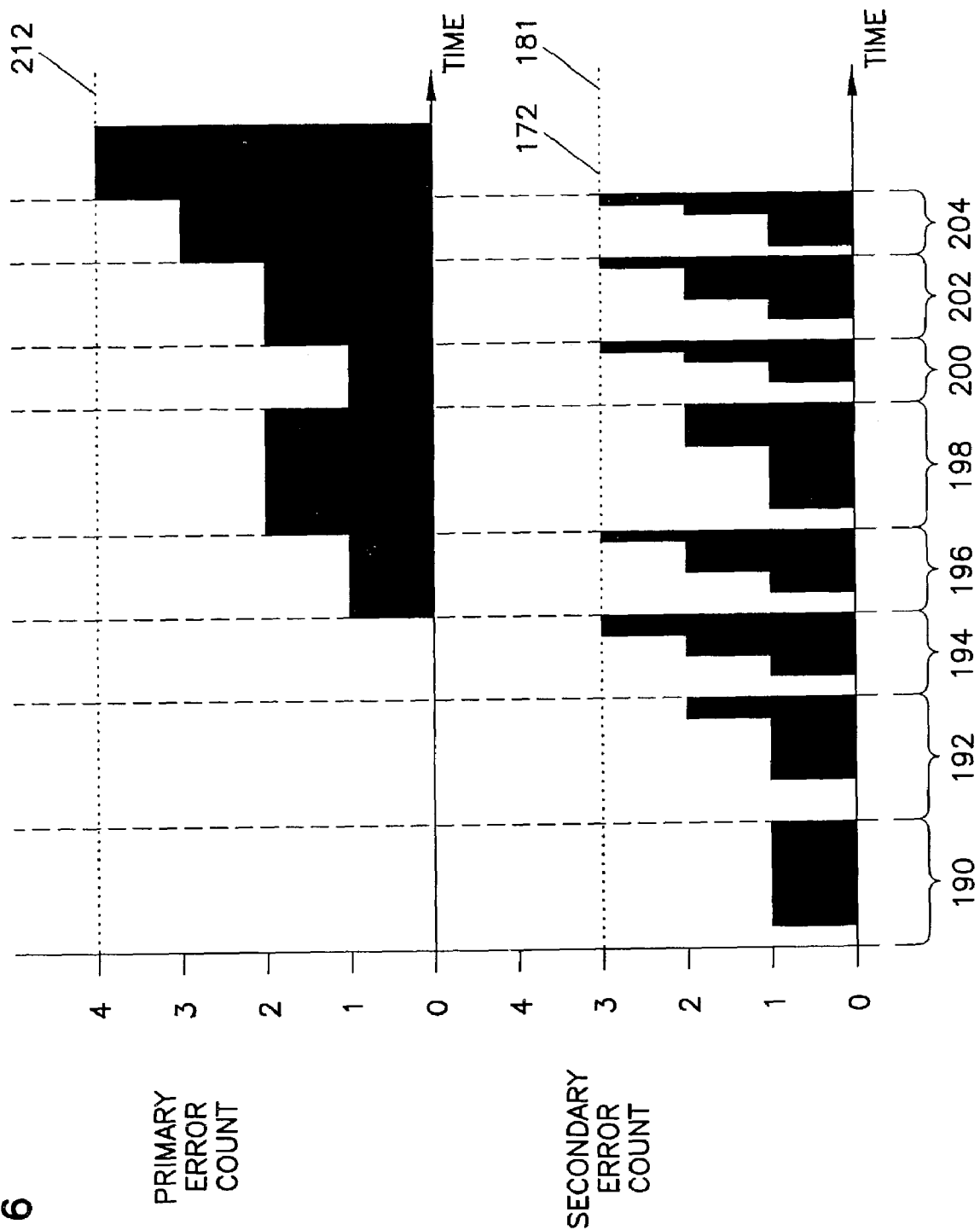

The above embodiments of the method of maintaining the primary error counts are further illustrated in the graphs of FIGS. 5 and 6, which respectively illustrate the maintaining of the primary and secondary error counts for fixed and variable intervals. For these examples, the predetermined relationship between the secondary error count and the secondary threshold value will be presumed to be reached when the secondary error count equals or exceeds the secondary threshold value. Also for these examples, the primary error count is decremented following the completion of an interval during which the predetermined relationship between the secondary error count and the correcting threshold value is reached. The correcting threshold value is set as being equal to the secondary threshold value and the predetermined relationship is reached when the secondary error count is less than the correcting threshold value of the completion of an interval.

With reference to FIG. 5, the secondary error count is incremented during a fixed interval 170 due to the detection of an error associated with the attribute that is being monitored. However, since the second error count failed to reach the secondary threshold value 172 (set to three for this example), the primary error count is not incremented. The secondary error count is then reset and another interval 174 is started, during which the predetermined relationship to the secondary threshold value 172 is again not met by the secondary error count. During intervals 176 and 178 the secondary error count reaches the predetermined relationship to the secondary threshold value 172 and the corresponding primary error count is incremented accordingly. During interval 180, the secondary error count fails to reach the predetermined relationship with the secondary threshold value 172, but reaches the predetermined relationship with the correcting threshold value 181. As a result, the primary error count is decremented following interval 180. Subsequently, the predetermined relationship between the secondary error count and the secondary threshold value is reached during intervals 182, 184, and 186, resulting in increments to the primary error count. Note that during interval 182, although the secondary error count exceeded the secondary threshold value, the additional secondary error count did not affect the primary error count or the secondary error count during the subsequent interval 184. As will be seen below, this results in a slower response time to the primary error count.

Referring now to FIG. 6, an example of the method of maintaining the primary error count using a variable interval will be discussed. At intervals 190 and 192, the secondary error count fails to reach the predetermined relationship to the secondary threshold value 172 prior to the expiration of the fixed or maximum interval length. Accordingly, the method continues by resetting the secondary error count and starting a new interval. However, during intervals 194 and 196, the secondary error count reaches the predetermined relationship to the secondary threshold value 172, causing the primary error count to be incremented and a new interval started. Thus, the interval can be shorter than the fixed interval resulting in the primary error count being incremented more quickly. This can result in earlier detection of imminent disc drive failure as compared to when a fixed interval is used, when the disc drive is degrading rapidly. During interval 198, the secondary error count meets the predetermined relationship to the correcting threshold value 181 resulting in the decrementing of the primary error count. The primary error count is again incremented during intervals 200, 202 and 204.

Figure 7:
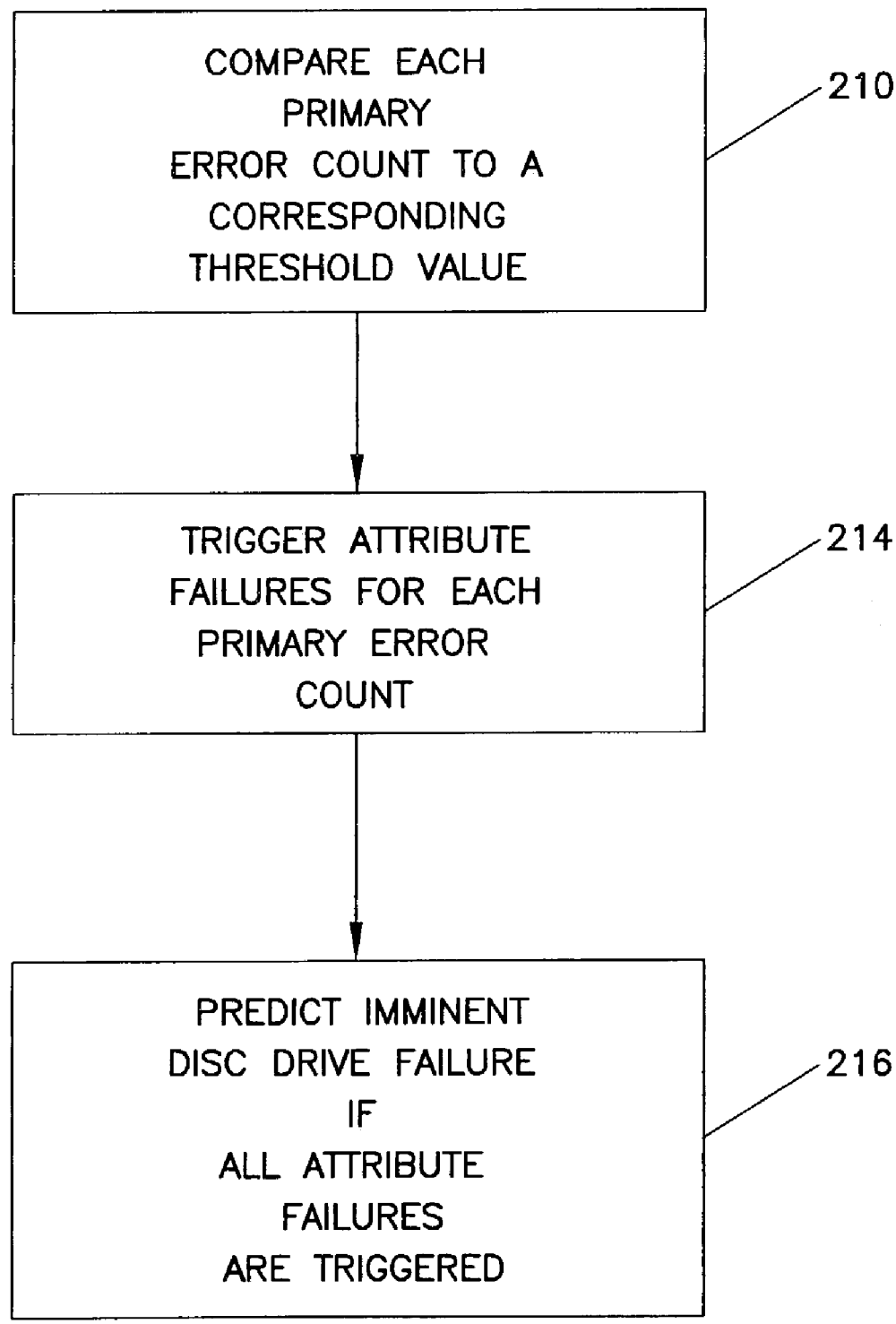
FIGS. 7 and 8 are flowcharts illustrating methods of predicting disc drive failure based upon a combination of multiple primary error counts, in accordance with various embodiments of the invention.

As discussed above, imminent disc drive failure is predicted based upon a combination of at least two primary error counts that correspond to disc drive errors associated with different attributes. In accordance with one embodiment of the invention, prediction of imminent disc drive failure at step 142 of the method of FIG. 2 requires a determination that each of the primary error counts indicates the potential for an imminent disc drive failure. This embodiment is illustrated in the flowchart of FIG. 7. At step 210, each primary error count maintained in step 140 (FIG. 2) is compared to a corresponding threshold value 212 (FIGS. 5 and 6). Next, attribute failures are triggered for each primary error count that reaches a predetermined relationship to the corresponding threshold value, at step 214. Finally, at step 216, imminent disc drive failure is predicted only after all of the attribute failures have been triggered. As long as some the attribute failures for some of the primary error counts being maintained have yet to be triggered, no prediction of imminent disc drive failure will be predicted and the method continues to maintain the multiple primary error counts as indicated at 140 of FIG. 2.

Figure 8:
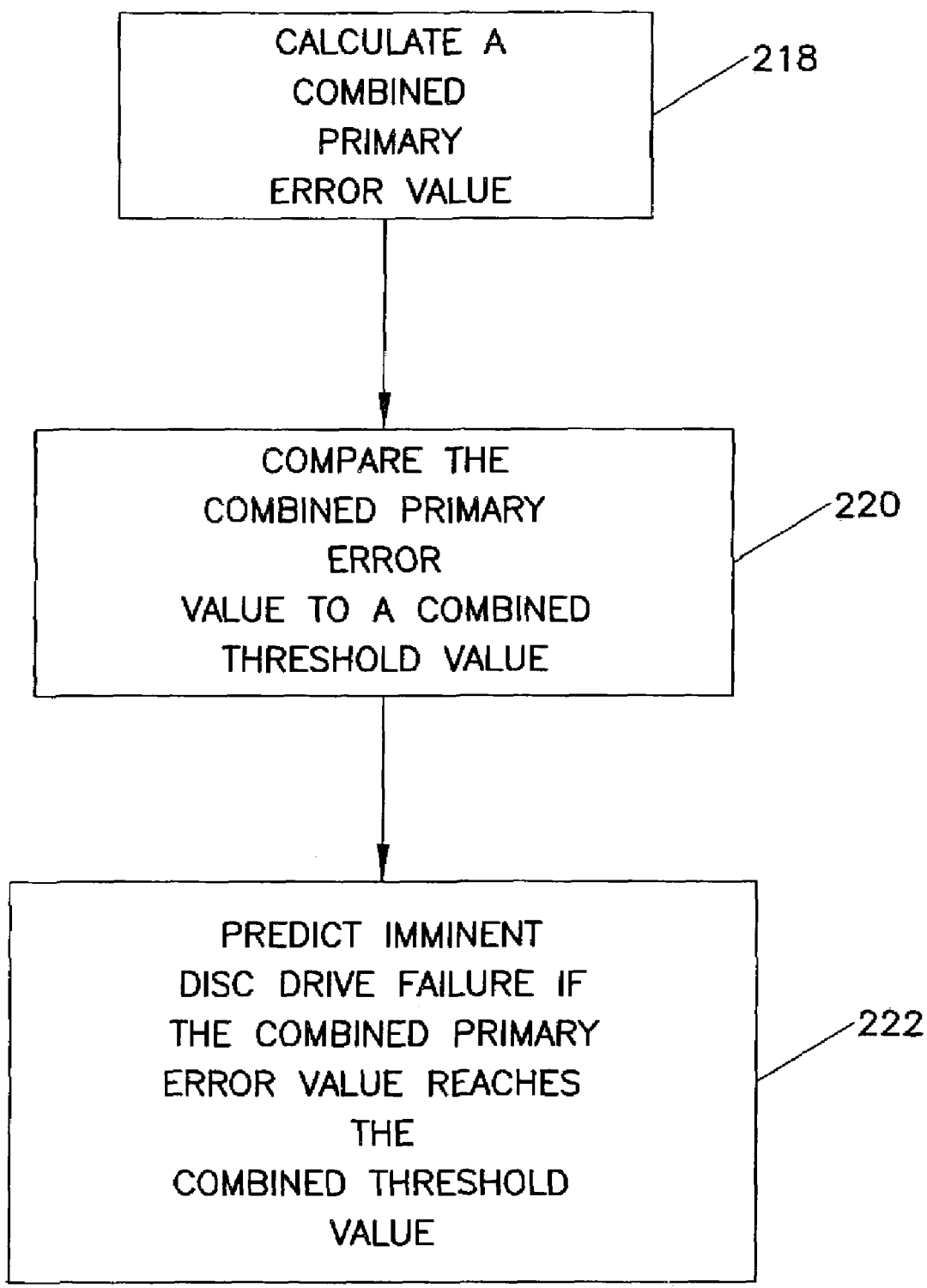

In accordance with another embodiment of the invention, imminent disc drive failure is predicted in step 142 (FIG. 2) of the method in the manner illustrated in the flowchart of FIG. 8, where a combined primary error value (CPEV) is calculated at step 218. The CPEV is a value that is calculated based upon a combination of the maintained primary error counts. In accordance with one embodiment, the CPEV is generally equal to the product obtained by multiplying the maintained primary error counts together. Additionally, each primary error count (PEC) can be assigned a different weight in the calculation by further multiplying it by a predetermined coefficient C, and/or applying a predetermined power of Q as shown in Equation 1 below. In this manner, each attribute can be weighted differently from the others, which allows attributes that are more indicative of disc drive failure to be given more weight than those that are less indicative of disc drive failure.

$$(C_1 *PEC_1^{Q_1})*(C_2 *PEC_2^{Q_2})* \ldots (C_n *PEC_n^{Q_n}) = CPEV \quad \text{Equation 1}$$

In accordance with another embodiment of the invention, the CPEV is equal to the summation of selected subsets of primary error counts that are multiplied together before summation, as shown in Equation 2. In Equation 2, "i" represents the ith subset of primary error counts and "j" represents the jth primary error count of the ith subset. Additionally, each subset can be assigned a different weight in the calculation as mentioned above by further multiplying by a predetermined coefficient of $C_i$ and/or applying a predetermined power of $Q_j$, as shown.

$$\Sigma_i [C_i *(\Pi_j PEC_j^{Q_j})] = CPEV \quad \text{Equation 2}$$

Continuing with the flowchart of FIG. 8, the combined primary error value is compared to a combined threshold value, at 220. Imminent disc drive failure is then predicted at 222, when the combined primary error value reaches a predetermined relationship to (e.g., equal to or greater than) the combined threshold value. Otherwise, the maintaining of the primary error counts continues at 140 of FIG. 2. In addition to empirically selecting an appropriate combined threshold value, the accuracy of the failure prediction of this method is based on the selection of primary error counts to be maintained (or the identification of subsets thereof) as well as any associated powers and coefficients used in the calculation of the combined primary error value.

In yet another embodiment of the method of the present invention, both of the methods described above with reference to FIGS. 7 and 8 are used simultaneously to provide the desired disc drive failure prediction. Thus, if either method results in the prediction of imminent disc drive failure, an appropriate warning can be generated.

In summary, the present invention is directed to a method of performing predictive failure analysis of a disc drive. In the method, at least two primary error counts are maintained (such as 140) during operation of the disc drive. The primary error counts each correspond to disc drive errors associated with different attributes of the disc drive and are potentially indicative of disc drive failure. Finally, imminent disc drive failure is predicted (such as 142) based upon a combination of the primary error counts.

In accordance with one embodiment, each primary error count is compared (such as 210) to a corresponding threshold value (such as 212). Next, attribute failures are triggered (such as 214) for each primary error count that reaches a predetermined relationship to a corresponding threshold value. Finally, a disc drive failure is predicted (such as 216) after all of the attribute failures have been triggered. In accordance with another embodiment, imminent disc drive failure is predicted by calculating a combined primary error value (such as 218). The combined primary error value is generally equal to the product obtained by multiplying the primary error counts together. Additionally, each primary error count can be assigned a different weight in the calculation by further multiplying it by a predetermined coefficient (such as Q). The combined primary error value is then compared to a combined threshold value (such as 220) and imminent disc drive failure is predicted when the combined primary error value reaches a predetermined relationship to the combined threshold value (such as 222).

The maintaining of the primary error counts generally involves starting an interval (such as 144) and incrementing a secondary error count (such as 148) when errors associated with the attribute being monitored are detected (such as 146) within either a fixed or variable interval (such as 150). Each primary error count is incremented (such as 159) when the secondary error count reaches a predetermined relationship to a secondary threshold value (such as 158). Otherwise, following the expiration of the interval, the secondary error count is reset (such as 160) and the interval restarted. In accordance with one embodiment of the invention, the primary error count is decremented (such as 164) following the expiration of the interval when the secondary error count reaches a predetermined relationship to a correcting threshold value (such as 162).

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, it should be understood that although the methods of the present invention are presented as including individual discreet steps, many of the steps of the methods can overlap and be performed simultaneously and in a different order than presented herein.

What is claimed is:

1. A method of performing predictive failure analysis of a disc drive during operation of the disc drive, comprising:
    a) maintaining a first primary error count corresponding to disc drive errors associated with a first attribute of the disc drive, the first primary error count potentially indicative of disc drive failure;
    b) maintaining a second primary error count corresponding to disc drive errors associated with a second attribute of the disc drive, the second primary error count potentially indicative of disc drive failure;
    c) triggering a first attribute failure when the first primary error count reaches a predetermined relationship to a first threshold value;
    d) triggering a second attribute failure when the second primary error count reaches a predetermined relationship to a second threshold value; and
    e) predicting imminent disc drive failure after both the first and second attribute failures are triggered.

2. The method of claim 1, including generating an alert when imminent disc drive failure is predicted.

3. The method of claim 1, wherein the first attribute failure is triggered when the first primary error count is equal to, or greater than, the first threshold value.

4. The method of claim 1, wherein the second attribute failure is triggered when the second primary error count is equal to, or greater than, the second threshold value.

5. The method of claim 1, wherein the maintaining step a) includes:
    1) detecting first errors associated with the first attribute;
    2) incrementing a first secondary error count for each detected first error;

3) comparing the first secondary error count to a first secondary threshold value;
4) repeating steps 1)–3) until either an expiration of a first interval, or when the first secondary error count reaches a predetermined relationship to the first secondary threshold value;
5) incrementing the first primary error count when the first secondary error count reaches the predetermined relationship to the first secondary threshold value;
6) resetting the first secondary error count;
7) restarting the first interval; and
8) returning to step 1).

6. The method of claim 5, wherein the maintaining step b) includes:
1) detecting second errors associated with the second attribute;
2) incrementing a second secondary error count for each detected second error;
3) comparing the second secondary count to a second secondary threshold value;
4) repeating steps 1)–3) until either an expiration of a second interval, or when the second secondary error count reaches a predetermined relationship to the second secondary threshold value;
5) incrementing the second primary error count when the second secondary count reaches the predetermined relationship to the second secondary threshold value;
6) resetting the second secondary error count;
7) restarting the second interval; and
8) returning to step 1).

7. The method of claim 6, wherein the predetermined relationship is reached in step b)4) when the second secondary error count is equal to, or greater than, the second secondary threshold value.

8. The method of claim 5, wherein the predetermined relationship is reached in step a)4) when the first secondary error count is equal to, or greater than, the first secondary threshold value.

9. The method of claim 1, wherein the maintaining step a) includes:
1) detecting first errors associated with the first attribute;
2) incrementing a first secondary error count for each detected first error;
3) comparing the first secondary error count to a first secondary threshold value;
4) repeating steps 1)–3) until either an expiration of a first interval, or when the first secondary error count reaches a predetermined relationship to the first secondary threshold value;
5) incrementing the first primary error count when the first secondary error count reaches the predetermined relationship to the first secondary threshold value;
6) decrementing the first primary error count when the first secondary error count reaches a predetermined relationship to a first correcting threshold value within the first interval;
7) resetting the first secondary error count;
8) restarting the first interval; and
9) returning to step 1).

10. The method of claim 9, wherein the maintaining step b) includes:
1) detecting second errors associated with the second attribute;
2) incrementing a second secondary error count for each detected second error;
3) comparing the second secondary error count to a second secondary threshold value;
4) repeating steps 1)–3) until either an expiration of a second interval, or when the second secondary error count reaches a predetermined relationship to the second secondary threshold value;
5) incrementing the second primary error count when the second secondary error count reaches the predetermined relationship to the second secondary threshold value;
6) decrementing the second primary error count when the second secondary error count reaches a predetermined relationship to a second correcting threshold value within the second interval;
7) resetting the second secondary error count;
8) restarting the second interval; and
9) returning to step 1).

11. The method of claim 10, wherein the predetermined relationship is reached in step b)4) when the second secondary error count is equal to, or greater than, the second secondary threshold value.

12. The method of claim 9, wherein the predetermined relationship is reached in step a)4) when the first secondary error count is equal to, or greater than, the first secondary threshold value.

13. The method of claim 1, wherein the first attribute corresponds to a recoverable read error.

14. The method of claim 1, wherein the second attribute corresponds to a recoverable seek error.

15. The method of claim 1, wherein the maintaining step a) includes:
1) detecting first errors associated with the first attribute;
2) incrementing a first secondary error count for each detected first error;
3) comparing the first secondary error count to a first secondary threshold value;
4) repeating steps 1)–3) until an expiration of a first interval;
5) incrementing the first primary error count when the first secondary error count reaches a predetermined relationship to the first secondary threshold value;
6) resetting the first secondary error count;
7) restarting the first interval; and
8) returning to step 1).

16. The method of claim 15, wherein the maintaining step b) includes:
1) detecting second errors associated with the second attribute;
2) incrementing a second secondary error count for each detected second error;
3) comparing the second secondary count to a second secondary threshold value;
4) repeating steps 1)–3) until an expiration of a second interval;
5) incrementing the second primary error count when the second secondary count reaches a predetermined relationship to the second secondary threshold value;
6) resetting the second secondary error count;
7) restarting the second interval; and
8) returning to step 1).

17. The method of claim 16, wherein the predetermined relationship is reached in step b)5) when the second secondary error count is equal to, or greater than, the second secondary threshold value.

18. The method of claim 15, wherein the predetermined relationship is reached in step a)5) when the first secondary error count is equal to, or greater than, the first secondary threshold value.

19. The method of claim 1, wherein the maintaining step a) includes:
1) detecting first errors associated with the first attribute;
2) incrementing a first secondary error count for each detected first error;
3) comparing the first secondary error count to a first secondary threshold value;
4) repeating steps 1)–3) until an expiration of a first interval;
5) incrementing the first primary error count when the first secondary error count reaches a predetermined relationship to the first secondary threshold value;
6) decrementing the first primary error count when the first secondary error count reaches a predetermined relationship to a first correcting threshold value within the first interval;
7) resetting the first secondary error count;
8) restarting the first interval; and
9) returning to step 1).

20. The method of claim 19, wherein the maintaining step b) includes:
1) detecting second errors associated with the second attribute;
2) incrementing a second secondary error count for each detected second error;
3) comparing the second secondary error count to a second secondary threshold value;
4) repeating steps 1)–3) until an expiration of a second interval;
5) incrementing the second primary error count when the second secondary error count reaches a predetermined relationship to the second secondary threshold value;
6) decrementing the second primary error count when the second secondary error count reaches a predetermined relationship to a second correcting threshold value within the second interval;
7) resetting the second secondary error count;
8) restarting the second interval; and
9) returning to step 1).

21. The method of claim 19, wherein the predetermined relationship is reached in step a)5) when the first secondary error count is equal to, or greater than, the first secondary threshold value.

22. A method of performing predictive failure analysis for a disc drive during operation of the disc drive, comprising:
a) maintaining a first primary error count corresponding to disc drive errors associated with a first attribute of the disc drive, the first primary error count potentially indicative of disc drive failure;
b) maintaining a second primary error count corresponding to disc drive errors associated with a second attribute of the disc drive, the second primary error count potentially indicative of disc drive failure;
c) calculating a combined primary error value, which is equal to the first primary error count multiplied by the second primary error count;
d) comparing the combined primary error value to a combined threshold value; and
e) predicting imminent disc drive failure when the combined primary error value reaches a predetermined relationship to the combined threshold value.

23. The method of claim 22, wherein a power is applied to at least one of the first or second primary error counts and/or the primary error counts are further multiplied by a coefficient in the step of calculating the combined primary error value.

24. A disc drive including a controller for performing predictive failure analysis of the disc drive during operation of the disc drive, the controller configured to execute instructions stored on a computerreadable medium to perform steps of:
maintaining a first primary error count corresponding to disc drive errors associated with a first attribute of the disc drive, the first primary error count potentially indicative of disc drive failure;
maintaining a second primary error count corresponding to disc drive errors associated with a second attribute of the disc drive, the second primary error count potentially indicative of disc drive failure;
triggering a first attribute failure when the first primary error count reaches a predetermined relationship to a first threshold value;
triggering a second attribute failure when the second primary error count reaches a predetermined relationship to a second threshold value; and
predicting imminent disc drive failure after both the first and second attribute failures are triggered.

25. The disc drive of claim 24, wherein the step of maintaining a first primary error count includes steps of:
1) detecting first errors associated with the first attribute;
2) incrementing a first secondary error count for each detected first error;
3) comparing the first secondary error count to a first secondary threshold value;
4) repeating steps 1)–3) until either an expiration of a first interval, or when the first secondary error count reaches a predetermined relationship to the first secondary threshold value;
5) incrementing the first primary error count when the first secondary error count reaches the predetermined relationship to the first secondary threshold value;
6) resetting the first secondary error count;
7) restarting the first interval; and
8) returning to detecting step 1).

26. The disc drive of claim 25, wherein the step of maintaining a second primary error count includes steps of:
1) detecting second errors associated with the second attribute;
2) incrementing a second secondary error count for each detected second error;
3) comparing the second secondary count to a second secondary threshold value;
4) repeating steps 1)–3) until either an expiration of a second interval, or when the second secondary error count reaches a predetermined relationship to the second secondary threshold value;
5) incrementing the second primary error count when the second secondary count reaches the predetermined relationship to the second secondary threshold value;
6) resetting the second secondary error count;
7) restarting the second interval; and
8) returning to the step of detecting second errors.

27. A controller for performing predictive failure analysis of a disc drive during operation of the disc drive, the controller configured to execute instructions stored on a computer-readable medium to perform steps of:
maintaining a first primary error count corresponding to disc drive errors associated with a first attribute of the disc drive, the first primary error count potentially indicative of disc drive failure;
maintaining a second primary error count corresponding to disc drive errors associated with a second attribute of the disc drive, the second primary error count potentially indicative of disc drive failure;

triggering a first attribute failure when the first primary error count reaches a predetermined relationship to a first threshold value;

triggering a second attribute failure when the second primary error count reaches a predetermined relationship to a second threshold value; and predicting imminent disc drive failure after both the first and second attribute failures are triggered.

28. The controller of claim 27, wherein the step of maintaining a first primary error count includes steps of:
 1) detecting first errors associated with the first attribute;
 2) incrementing a first secondary error count for each detected first error;
 3) comparing the first secondary error count to a first secondary threshold value;
 4) repeating steps 1)–3) until either an expiration of a first interval, or when the first secondary error count reaches a predetermined relationship to the first secondary threshold value;
 5) incrementing the first primary error count when the first secondary error count reaches the predetermined relationship to the first secondary threshold value;
 6) resetting the first secondary error count;
 7) restarting the first interval; and
 8) returning to detecting step 1).

29. The controller of claim 28, wherein the step of maintaining a second primary error count includes steps of:
 1) detecting second errors associated with the second attribute;
 2) incrementing a second secondary error count for each detected second error;
 3) comparing the second secondary count to a second secondary threshold value;
 4) repeating steps 1)–3) until either an expiration of a second interval, or when the second secondary error count reaches a predetermined relationship to the second secondary threshold value;
 5) incrementing the second primary error count when the second secondary count reaches the predetermined relationship to the second secondary threshold value;
 6) resetting the second secondary error count;
 7) restarting the second interval; and
 8) returning to the step of detecting second errors.

* * * * *